United States Patent
Hatano

(10) Patent No.: US 11,941,205 B2
(45) Date of Patent: Mar. 26, 2024

(54) DISPLAY SYSTEM, CONTROL DEVICE, AND CONTROL METHOD THAT APPLY A TOUCH DRIVE SIGNAL INCLUDING A HARMONIC TO COMMON ELECTRODES

(71) Applicant: Panasonic Intellectual Property Management Co., Ltd., Osaka (JP)

(72) Inventor: Takashi Hatano, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/950,672

(22) Filed: Sep. 22, 2022

(65) Prior Publication Data

US 2023/0010276 A1 Jan. 12, 2023

Related U.S. Application Data

(63) Continuation of application No. PCT/JP2020/044534, filed on Nov. 30, 2020.

(30) Foreign Application Priority Data

Mar. 27, 2020 (JP) .................................. 2020-057385

(51) Int. Cl.
G06F 3/041 (2006.01)
G06F 3/044 (2006.01)

(52) U.S. Cl.
CPC ...... *G06F 3/041662* (2019.05); *G06F 3/0412* (2013.01); *G06F 3/04164* (2019.05); *G06F 3/0446* (2019.05)

(58) Field of Classification Search
None
See application file for complete search history.

(56) References Cited

U.S. PATENT DOCUMENTS 10,572,055 B2  2/2020  Shin
11,126,302 B2  9/2021  Shin
(Continued)

FOREIGN PATENT DOCUMENTS

JP  2016-200886  12/2016
JP  2016200886 A  * 12/2016
(Continued)

OTHER PUBLICATIONS

International Search Report (ISR) from International Searching Authority (Japan Patent Office) in International Pat. Appl. No. PCT/JP2020/044534, dated Dec. 28, 2020, together with an English language translation.

*Primary Examiner* — Kirk W Hermann
(74) *Attorney, Agent, or Firm* — Greenblum & Bernstein, P.L.C.

(57) ABSTRACT

In a display system, a display device includes a plurality of common electrodes commonly used for image display and touch detection. A second drive circuit supplies a touch drive signal to each of the plurality of common electrodes. A touch detection circuit detects a touch by an object on the display device based on a detection signal received from each of the plurality of common electrodes. The touch drive signal includes a harmonic having a frequency different from a designated frequency and does not include a harmonic having the designated frequency.

6 Claims, 14 Drawing Sheets

(56) References Cited

U.S. PATENT DOCUMENTS

| | | | |
|---|---|---|---|
| 2014/0152617 A1* | 6/2014 | Kida | G06F 3/04166 345/174 |
| 2015/0160754 A1* | 6/2015 | Wenzel | G06F 3/041662 345/174 |
| 2017/0031505 A1* | 2/2017 | Kwon | G06F 3/0412 |
| 2017/0131829 A1* | 5/2017 | Takahashi | G06F 3/04182 |
| 2018/0004343 A1 | 1/2018 | Shin | |
| 2020/0174617 A1 | 6/2020 | Shin | |
| 2021/0191562 A1* | 6/2021 | Han | G06F 3/04182 |
| 2021/0397294 A1 | 12/2021 | Shin | |

FOREIGN PATENT DOCUMENTS

| | | |
|---|---|---|
| JP | 2018-005882 | 1/2018 |
| WO | 2018/123813 | 7/2018 |

\* cited by examiner

22

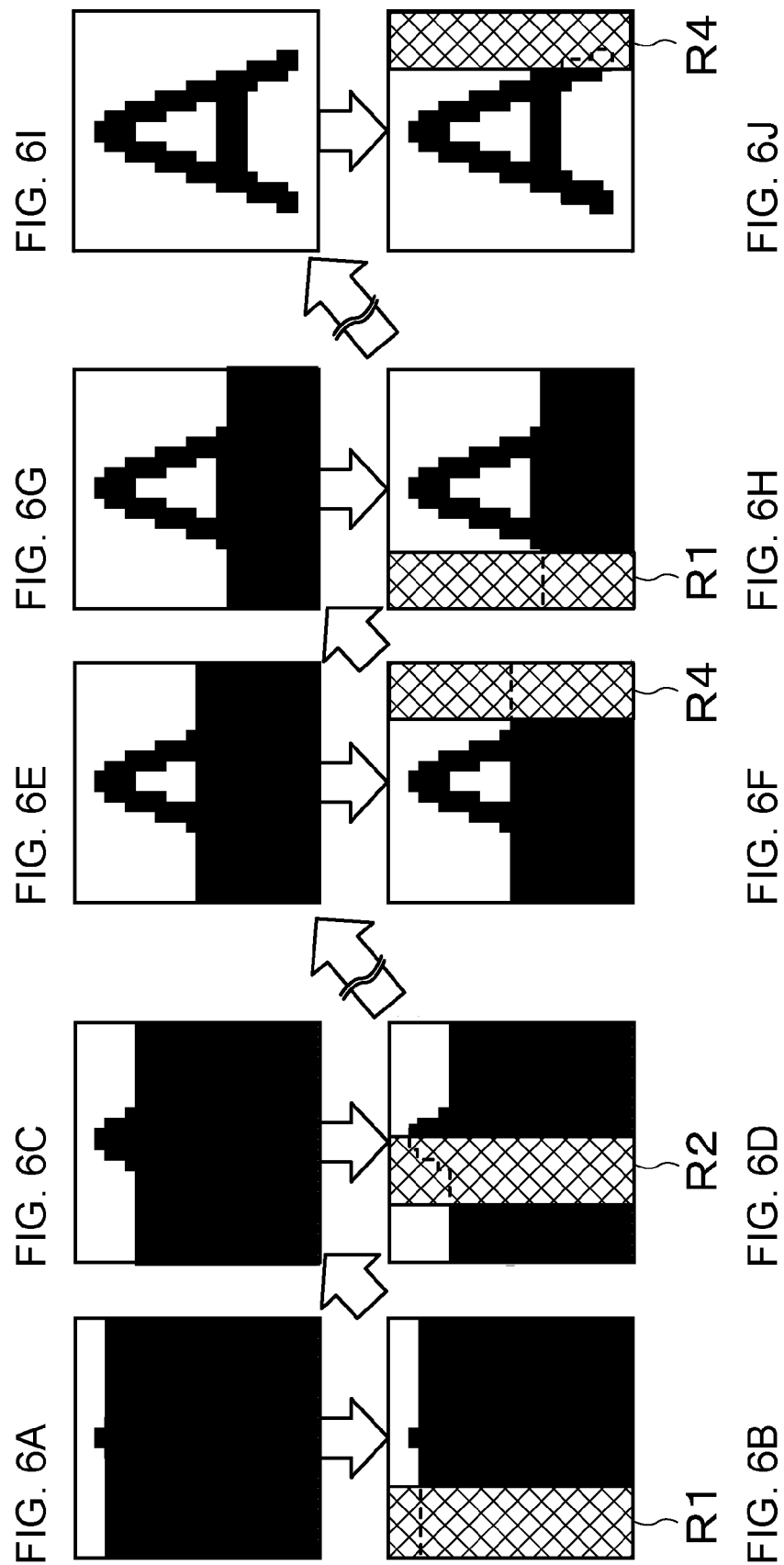

(COMPARATIVE EXAMPLE)

(COMPARATIVE EXAMPLE)
50 kHz RECTANGULAR WAVE

| FREQUENCY | RECTANGULAR WAVE | SINUSOIDAL WAVE | COMPOSITE WAVE (1, 3) | COMPOSITE WAVE (1, 3, 5) | COMPOSITE WAVE (1, 3, 5, 7) | COMPOSITE WAVE (1, 3, 5, 7, 9) |
|---|---|---|---|---|---|---|
| 50kHz | 100.0% | 57.2% | 82.6% | 84.8% | 85.5% | 89.8% |
| 70kHz | 100.0% | 59.9% | 85.1% | 88.1% | 88.6% | — |
| 80kHz | 100.0% | 61.1% | 86.0% | 89.1% | — | — |

DISPLAY SYSTEM, CONTROL DEVICE, AND CONTROL METHOD THAT APPLY A TOUCH DRIVE SIGNAL INCLUDING A HARMONIC TO COMMON ELECTRODES

CROSS-REFERENCE TO RELATED APPLICATIONS

This application is a Continuation of International Application No. PCT/JP2020/044534, filed on Nov. 30, 2020, which in turn claims the benefit of Japanese Application No. 2020-057385, filed on Mar. 27, 2020, the disclosures of which Applications are incorporated by reference herein.

BACKGROUND

1. Field

The present disclosure relates to a display system provided with a touch detection function, a control device, and a control method.

2. Description of the Related Art

An in-cell display device, in which a touch sensor for detecting a user's touch position is built into a display panel, is known (see Patent Literature 1, for example). In such a display device, a common electrode used to supply a common voltage to each pixel of a liquid crystal display panel is divided into multiple common electrodes, which are also used as touch sensor electrodes. During an image display period, a common voltage is supplied to each of the multiple common electrodes, and, during a touch detection period, a touch drive signal for touch detection is supplied to each of the multiple common electrodes.

[Patent Literature 1] WO2018/123813

SUMMARY

For in-cell display devices, further improvement has been required.

To solve the problem above, a display system according to an embodiment of the present disclosure includes: a display device including a plurality of common electrodes commonly used for image display and touch detection; a drive circuit that supplies a touch drive signal to each of the plurality of common electrodes; and a touch detection circuit that detects a touch by an object on the display device based on a detection signal received from each of the plurality of common electrodes. The touch drive signal includes a harmonic having a frequency different from a designated frequency and does not include a harmonic having the designated frequency.

Another embodiment of the present disclosure relates to a control device. The device is a control device adapted to control a display device including a plurality of common electrodes commonly used for image display and touch detection, the control device including: a drive circuit that supplies a touch drive signal to each of the plurality of common electrodes; and a touch detection circuit that detects a touch by an object on the display device based on a detection signal received from each of the plurality of common electrodes. The touch drive signal includes a harmonic having a frequency different from a designated frequency and does not include a harmonic having the designated frequency.

Still another embodiment of the present disclosure is a control method. The method is a control method adapted to control a display device including a plurality of common electrodes commonly used for image display and touch detection, the control method including: supplying a touch drive signal to each of the plurality of common electrodes; and detecting a touch by an object on the display device based on a detection signal received from each of the plurality of common electrodes. The touch drive signal includes a harmonic having a frequency different from a designated frequency and does not include a harmonic having the designated frequency.

BRIEF DESCRIPTION OF DRAWINGS

FIGS. 6A-6J show a specific example in which image display and touch detection are performed according to the control timing shown in FIG. 5;

DETAILED DESCRIPTION

The invention will now be described by reference to the preferred embodiments. This does not intend to limit the scope of the present invention, but to exemplify the invention.

(Base Findings of Present Disclosure)

Before specific description of embodiments are given, the base findings will be described. In-cell touch displays are not provided with electrodes that are located closer to the observer than the common electrode, and so the in-cell touch displays emit noise more easily than out-cell display devices in which a touch sensor electrode is provided closer to the observer than the common electrode. Therefore, electromagnetic waves caused by harmonic components of the touch drive signal supplied to the common electrode are radiated, and the radiation has the possibility of affecting a receiver, etc. around.

The inventor has identified a problem in that it is possible to suppress radiation of harmonics by using a sinusoidal touch drive signal but a sinusoidal touch drive signal reduces touch detection sensitivity. To address the issue, the display system according to the present disclosure is configured as described below.

First Embodiment

Figure 1:
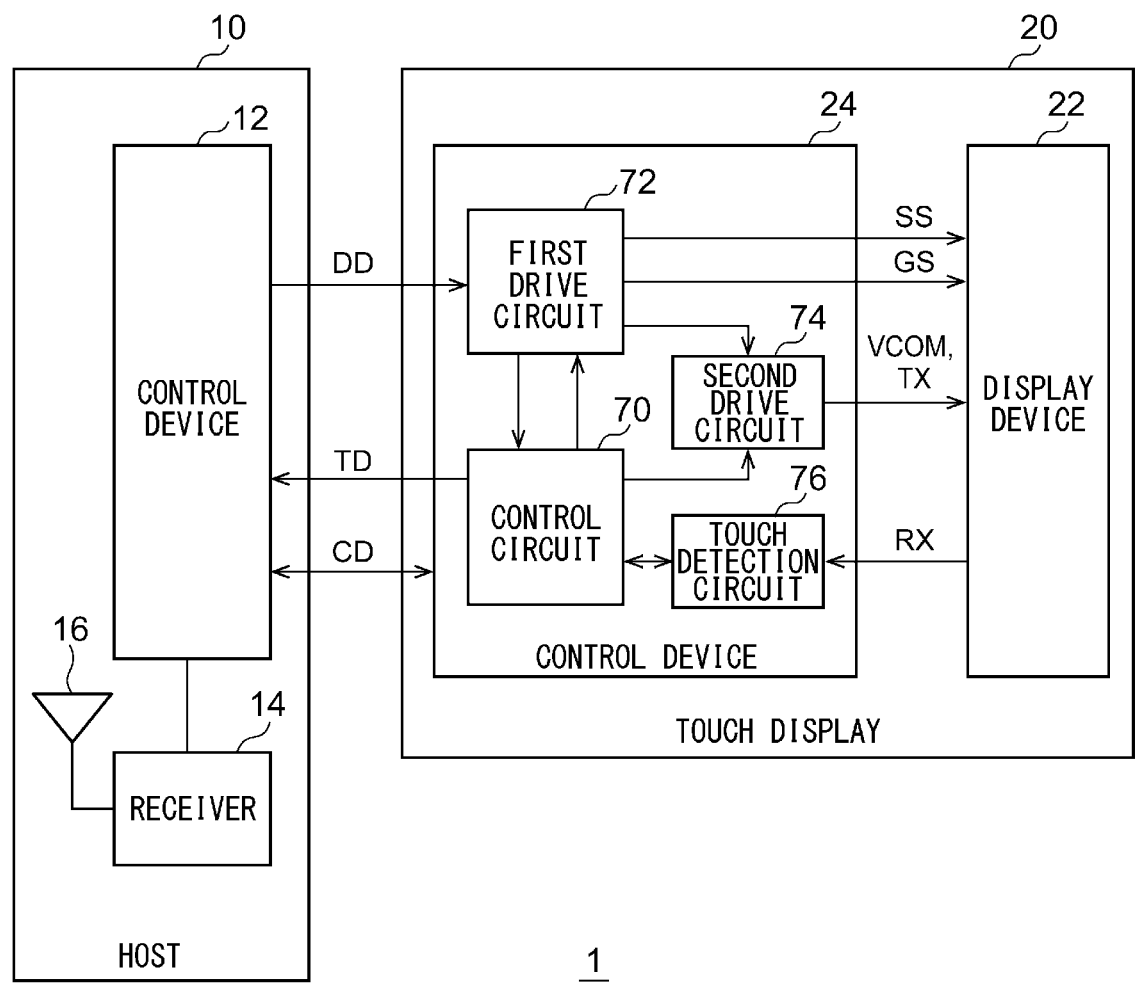
FIG. 1 is a block diagram of a display system according to a first embodiment.

FIG. 1 is a block diagram of a display system 1 according to the first embodiment. Although an example will be described in which the display system 1 is a vehicle-mounted display system 1 mounted on a vehicle, such as an automobile, the application is not particularly limited, and the display system 1 may also be used for a mobile device.

The display system 1 includes a host 10 and a touch display 20. The host 10 performs various functions, such as radio, car navigation, and Bluetooth (registered trademark) communication and controls the touch display 20. The host 10 includes a control device 12, a receiver 14, and an antenna 16.

The control device 12 is, for example, a CPU and is also called a host CPU. The control device 12 controls the receiver 14, supplies image data DD and control data CD to the touch display 20 and controls the touch display 20 based on such data.

The receiver 14 receives a wireless signal via the antenna 16. The receiver 14 includes at least one of radio reception function, GPS reception function, and Bluetooth reception function. In the case the receiver 14 includes multiple reception functions, the antenna 16 may include individual antennas for the respective reception functions.

The touch display 20 includes a display device 22 and a control device 24. The display device 22 may be used as a center display, on which a car navigation screen or the like is displayed, within a vehicle cabin, for example.

The display device 22 is an in-cell liquid crystal display device of an in plane switching (IPS) type and configured as a touch display on which a touch position can be detected. The configuration of the display device 22 may be a well-known configuration as described below, for example.

Figure 2:
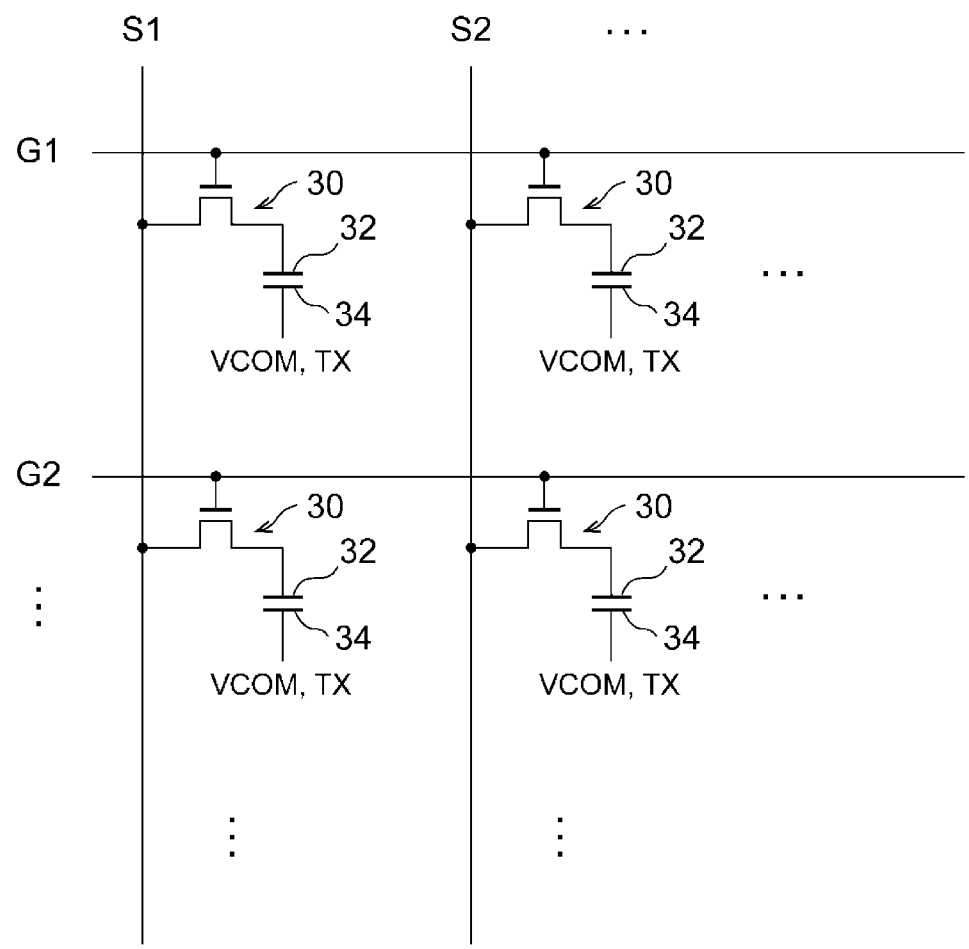
FIG. 2 is a diagram that schematically shows a circuit configuration of a display device shown in FIG. 1.

FIG. 2 schematically shows a circuit configuration of the display device 22 shown in FIG. 1. FIG. 2 also shows a schematic arrangement of constituting elements. The display device 22 includes multiple gate lines G1, G2, and so on extending in a row direction, multiple source lines S1, S2, and so on extending in a column direction, multiple pixel switching elements 30, multiple pixel electrodes 32, and multiple common electrodes 34. Each pixel switching element 30 is a thin-film transistor provided near an intersection of a gate line and a source line such as to correspond to a pixel. In each pixel switching element 30, the gate is connected with a gate line, the source is connected with a source line, and the drain is connected with a pixel electrode 32. For one common electrode 34, multiple pixel switching elements 30 and multiple pixel electrodes 32 are arranged. The liquid crystal layer is controlled by means of electric fields between pixel electrodes 32 and common electrodes 34. The common electrodes 34 are used for both image display and touch detection. Accordingly, the number of electrode layers can be reduced, so that the display device 22 can be made thinner. The common electrodes 34 may also be referred to as sensor electrodes.

Figure 3:
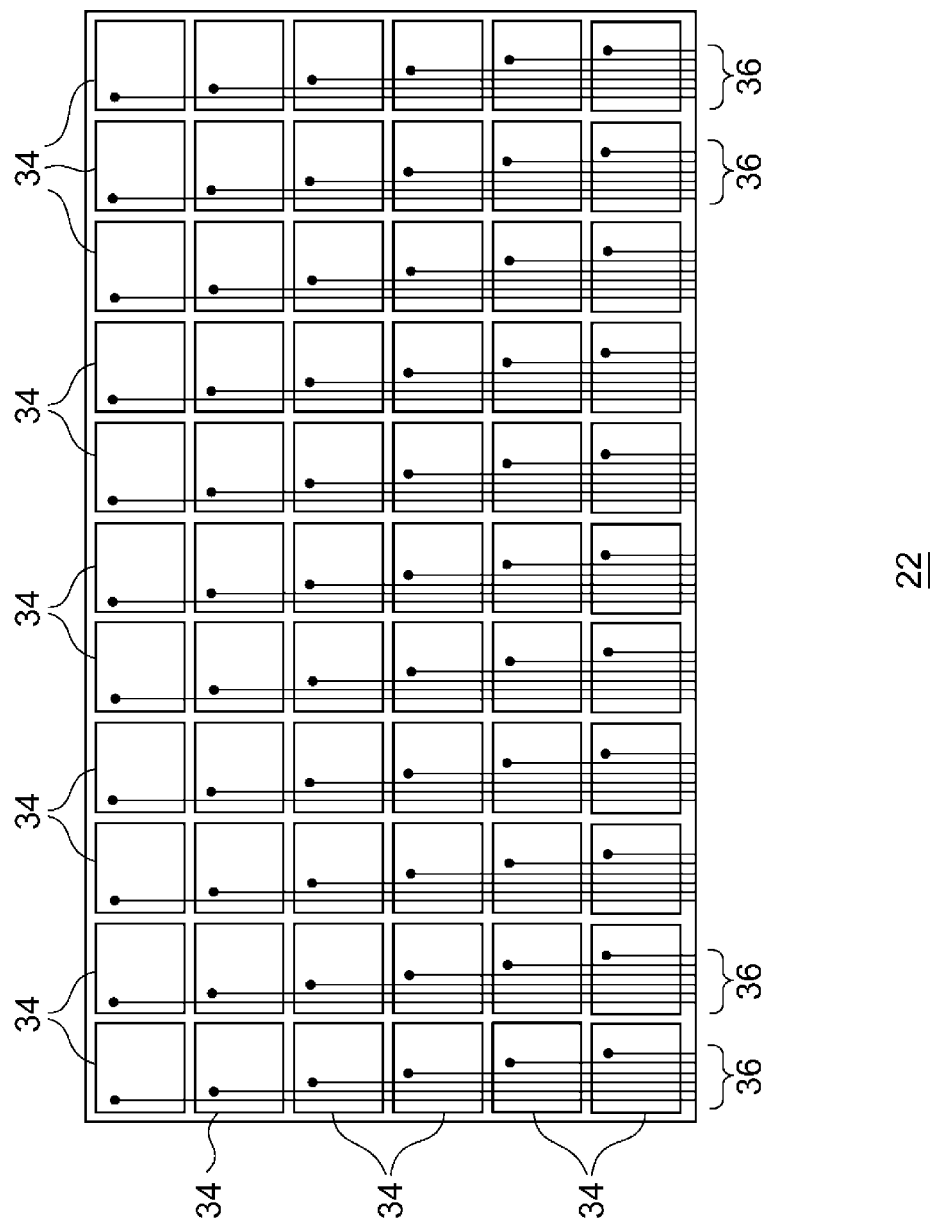
FIG. 3 is a top view that shows an arrangement of common electrodes shown in FIG. 2.

FIG. 3 is a top view that shows an arrangement of the common electrodes 34 shown in FIG. 2. The multiple common electrodes 34 are arranged in a matrix. Each common electrode 34 is connected to the control device 24 with a signal line 36.

The display device 22 detects a touch position based on the self-capacitance method. When a finger is brought closer to the display surface of the display device 22, capacitance is formed between a common electrode 34 and the finger. The formation of capacitance increases parasitic capacitance in the common electrode 34, so that the current flowing when a touch drive signal is supplied to the common electrode 34 is increased. Based on the current variation, the touch position is detected.

Figure 4:
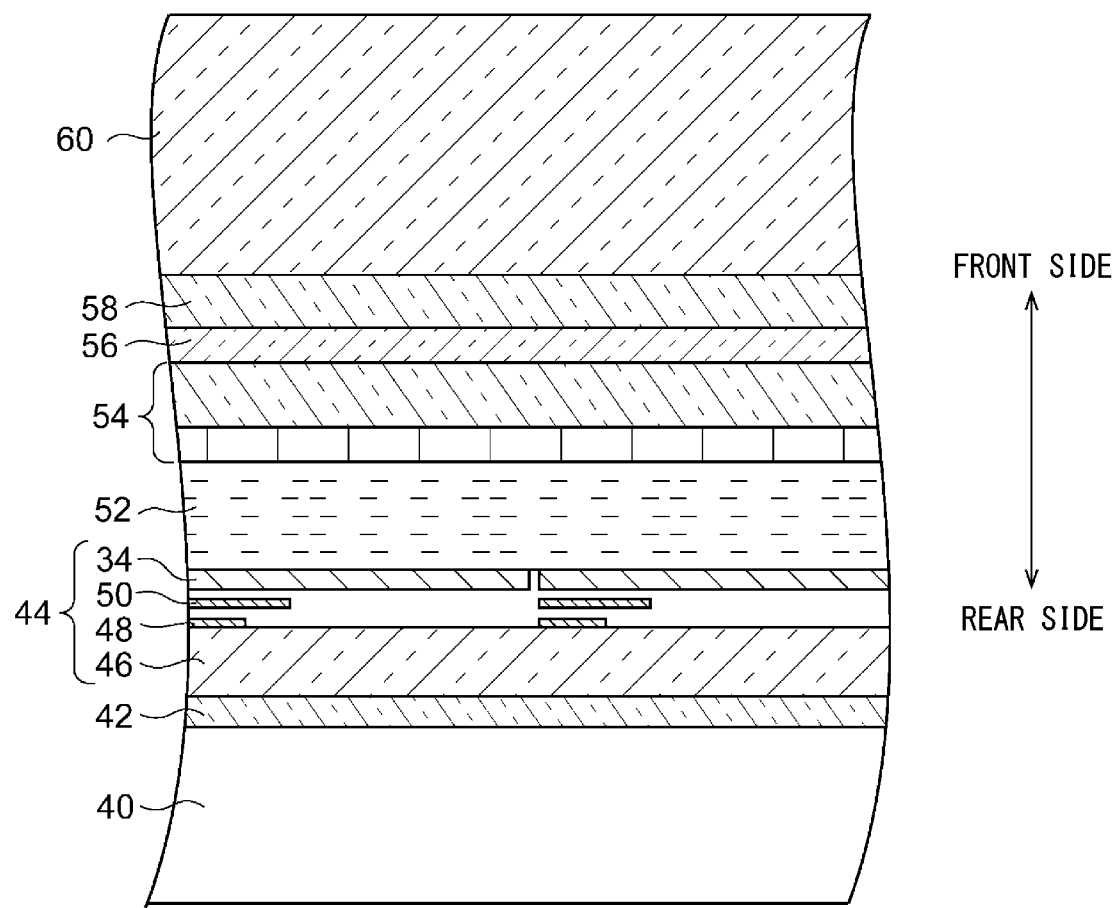
FIG. 4 is a longitudinal sectional view of the display device shown in FIG. 1.

FIG. 4 is a longitudinal sectional view of the display device 22 shown in FIG. 1. The display device 22 includes a backlight unit 40, a lower polarizer 42, a thin-film transistor substrate (hereinafter, referred to as a TFT substrate) 44, a liquid crystal layer 52, a color filter substrate 54, an upper polarizer 56, a bonding layer 58, and a protection layer 60, which are laminated and disposed in this order along a depth direction.

In the following, with regard to the depth directions of the display device 22, the side on which the protection layer 60 is positioned with respect to the TFT substrate 44 is defined as the front side, and the opposite side is defined as the rear side.

Using the light emitted from the backlight unit 40, the display device 22 emits image light toward the front side, or the viewer side.

The TFT substrate 44 includes a glass substrate 46 and also includes multiple gate electrodes 48, multiple source electrodes 50, and multiple common electrodes 34, which are arranged on the front side of the glass substrate 46. The TFT substrate 44 also includes the multiple gate lines G1, G2, and so on, the multiple source lines S1, S2, and so on, the multiple pixel electrodes 32, and the multiple pixel switching elements 30 shown in FIG. 2, though the illustration thereof is omitted. The liquid crystal layer 52 disposed on the front side of the TFT substrate 44 is controlled by means of lateral electric fields that occur between pixel electrodes 32 and common electrodes 34.

The bonding layer 58 has translucency and bonds the upper polarizer 56 and the protection layer 60. The bonding layer 58 may be formed by curing transparent resin in a liquid state, such as optically clear resin (OCR), or curing a transparent adhesive sheet, such as optically clear adhesive (OCA), for example.

The protection layer 60 is a layer that has translucency and protects the display device 22, and the protection layer 60 is constituted by a glass substrate or a plastic substrate, for example. The protection layer 60 is also called a cover lens, for example.

The description now returns to FIG. 1. The control device 24 may be configured as an IC, for example, and controls the display device 22 based on the control data CD and the image data DD from the host 10. The control device 24 includes a control circuit 70, a first drive circuit 72, a second drive circuit 74, and a touch detection circuit 76.

The control circuit 70 may be configured as a microcomputer, for example, and controls signal generation timing of the first drive circuit 72 and the second drive circuit 74, touch detection timing of the touch detection circuit 76, and the like.

The control circuit 70 controls the first drive circuit 72, the second drive circuit 74, and the touch detection circuit 76 such that, during a unit frame period (one frame period), one frame of a display image is rendered on the display device 22 and touch detection for one screen is performed at least once. Touch detection for one screen can be said to be touch scan for one screen. The unit frame period may also be referred to as a vertical synchronization period. The unit frame period will be detailed later.

The first drive circuit 72 generates a reference clock signal under the control of the control circuit 70. The first drive circuit 72 generates, under the control of the control circuit 70, a source signal SS in synchronization with the generated reference clock signal, based on the image data DD from the host 10. The first drive circuit 72 generates, under the control of the control circuit 70, a gate signal GS in synchronization with the generated reference clock signal.

The first drive circuit 72 supplies the source signal SS serially to multiple source lines in the display device 22, and also supplies the gate signal GS serially to multiple gate lines in the display device 22.

The first drive circuit 72 supplies the reference clock signal to the second drive circuit 74. The second drive circuit 74 generates a reference voltage VCOM, which is a predetermined fixed voltage, and a touch drive signal TX in synchronization with the reference clock signal, under the control of the control circuit 70. Through the signal lines 36 shown in FIG. 3, the second drive circuit 74 supplies the reference voltage VCOM or the touch drive signal TX to the multiple common electrodes 34 in the entire display device 22. The touch drive signal TX will be detailed later.

The touch detection circuit 76 detects a touch by an object on the display device 22. Under the control of the control circuit 70, the touch detection circuit 76 performs detection of a touch by an object on a position corresponding to a common electrode 34, based on a touch detection signal Rx received from the common electrode 34 when the touch drive signal TX is supplied to each common electrode 34.

The touch detection circuit 76 integrates, over a predetermined period of time from the rising edge of each pulse of the touch drive signal TX, the touch detection signal RX received from each common electrode 34 and derives a difference value between the integrated value and a reference value. Alternatively or additionally, the touch detection circuit 76 may integrate, over a predetermined period of time from the falling edge of each pulse of the touch drive signal TX, the touch detection signal RX received from each common electrode 34 and derives a difference value between the integrated value and a reference value. For the touch detection signal RX received from one common electrode 34 during one touch detection period, the number of obtained difference values is proportional to the number of pulses of the touch drive signal TX within one touch detection period. Each of the difference values represents a difference value between the capacitance of the common electrode 34 and a reference capacitance. The touch detection circuit 76 calculates a detection value derived from averaging the difference values for each common electrode 34. When the capacitance variation in a common electrode 34 due to a touch by an object is larger, the detection value becomes larger. When there is no touch and the capacitance variation in a common electrode 34 is zero, the detection value is also zero.

The touch detection circuit 76 compares the detection value based on the touch detection signal RX received from each common electrode 34 with a predetermined touch detection threshold value. When the detection value is greater than or equal to the touch detection threshold value, the touch detection circuit 76 judges that there has been a touch to the position of the corresponding common electrode 34. This corresponds to detection of a touch. Based on the position of the common electrode 34 for which it is judged that there has been a touch, the touch detection circuit 76 detects a touch position within the screen. The touch detection circuit 76 outputs touch position information of the touch position thus detected to the control circuit 70. The touch detection circuit 76 may derive the sum of multiple detection values of some of multiple common electrodes 34 in the display device 22. In this case, the touch detection circuit 76 may judge that there has been a touch to the position of the multiple common electrodes 34 corresponding to the sum of the detection values when the sum of the detection values is greater than or equal to the touch detection threshold value and may detect a touch position within the screen based on the position for which it is judged that there has been a touch.

Based on the touch position information from the touch detection circuit 76, the control circuit 70 derives coordinate data TD of the touch position and outputs a touch report including the derived coordinate data TD to the control device 12 in the host 10 when touch detection for one screen is completed. The control device 12 performs various processes based on the coordinate data TD.

The control circuit 70 performs frequency hopping control in accordance with the amount of exogenous noise having the frequency of the touch drive signal TX. When a noise having the frequency of the touch drive signal TX is detected, the control circuit 70 changes the frequency of the touch drive signal TX. This can suppress reduction in touch detection precision or sensitivity due to exogenous noise. For detection of exogenous noise and frequency hopping, a well-known art can be used.

The control circuit 70 derives the reference value used for determination on a touch described above at a predetermined point of time. The predetermined point of time may include when the display system 1 is started, when a predetermined period of time has elapsed since the previous derivation, before changing the frequency of the touch drive signal TX by frequency hopping, etc.

To derive the reference value, the control circuit 70 requests for an integrated value from the touch detection circuit 76. In response to a request for an integrated value, the touch detection circuit 76 integrates the touch detection signal RX received from each common electrode 34 at each point of time when a pulse of the touch drive signal TX occurs and outputs the integrated value related to each common electrode 34 to the control circuit 70.

The control circuit 70 derives a reference value related to the reference capacitance of each common electrode 34 based on multiple integrated values output from the touch detection circuit 76. For derivation of the reference value, a publicly known technology can be used. For example, the control circuit 70 defines, for each common electrode 34, a statistical value of multiple integrated values over a predetermined number of successive unit frame periods as the reference value.

The configurations of the control device 12 and the control circuit 70 can be implemented by cooperation between hardware resources and software resources or only by hardware resources. As the hardware resources, analog devices, microcomputers, DSPs, ROMs, RAMs, FPGAs, or other LSIs can be employed. As the software resources, programs, such as firmware, can be employed.

In the following, the control of the display device 22 performed by the control circuit 70 and the operations of the display device 22 will be specifically described. The display device 22 includes multiple display areas produced by dividing the multiple common electrodes 34 within the screen into multiple groups and multiple touch detection areas produced by dividing the multiple common electrodes 34 within the screen into multiple groups. The touch detection circuit 76 receives the touch detection signal RX for each touch detection area. The control circuit 70 alternately repeats partial touch detection in one of multiple touch detection areas within the screen and partial image display in one of multiple display areas within the screen so as to control the touch detection and the image display in a time division manner.

Figure 5:
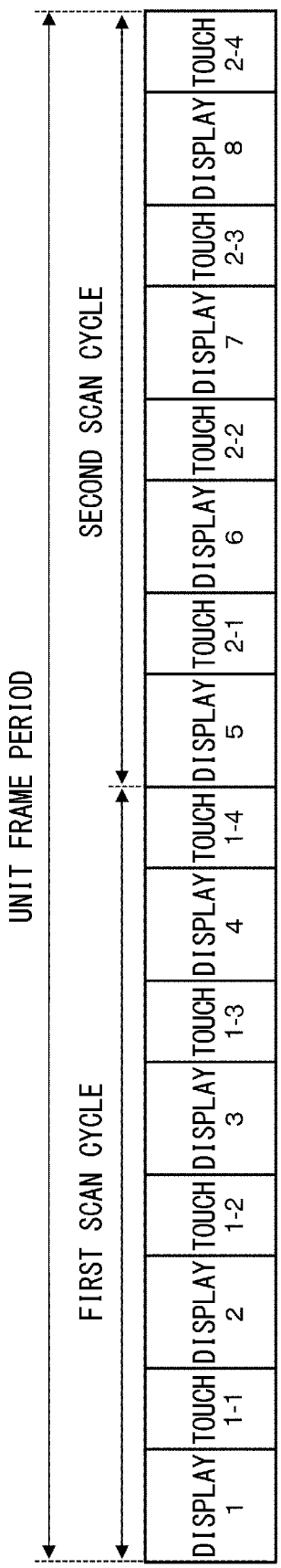
FIG. 5 shows an exemplary timing of control performed by the control circuit of FIG. 1.

FIG. 5 shows an exemplary timing of control performed by the control circuit 70 of FIG. 1. FIG. 5 shows an example in which one image is displayed and touch detection for one screen is performed twice in one unit frame period (one frame period). In this embodiment, the display device 22 configured to display images by being driven at 60 Hz is assumed. Therefore, the unit frame period is set to about 16.7 (=1/60) ms. The touch report rate is 120 Hz.

In the example shown in FIG. 5, the control circuit 70 forms eight display areas and forms four touch detection areas within the screen. The eight display areas are formed by slicing the screen in the horizontal direction at seven locations to result in eight equal parts arranged in the vertical direction. The topmost display area will be referred to as the first display area, the second display area from the top will be referred to as the second display area, . . . , and the bottom display area will be referred to as the eighth display area. The four touch detection areas are formed by slicing the screen in the vertical direction at three locations to result in four equal parts arranged in the horizontal direction. Hereinafter, the leftmost touch detection area will be referred to as the first touch detection area, the second touch detection area from the left will be referred to as the second touch detection area, and the third touch detection area from the left will be referred to as the third touch detection area, and the rightmost touch detection area will be referred to as the fourth touch detection area. The number of display areas is not limited to "eight", and the number of touch detection areas is not limited to "four", either.

In a unit frame period, the control circuit 70 controls image display in the first display area, touch detection in the first touch detection area, image display in the second display area, touch detection in the second touch detection area, image display in the third display area, touch detection in the third touch detection area, image display in the fourth display area, touch detection in the fourth touch detection area, image display in the fifth display area, touch detection in the first touch detection area, image display in the sixth display area, touch detection in the second touch detection area, image display in the seventh display area, touch detection in the third touch detection area, image display in the eighth display area, touch detection in the fourth touch detection area in the stated order. According to this control, the control circuit 70 performs the first touch detection for one screen while an image in the upper half of the screen is being displayed and performs the second touch detection for one screen while an image in the lower half of the screen is being displayed.

FIGS. 6A-6J show a specific example in which image display and touch detection are performed according to the control timing shown in FIG. 5. FIG. 6A shows image display in the first display area, FIG. 6B shows the first touch detection in the first touch detection area R1, FIG. 6C shows image display in the second display area, FIG. 6D shows the first touch detection in the second touch detection area R2, FIG. 6E shows image display in the fourth display area, FIG. 6F shows the first touch detection in the fourth touch detection area R4, FIG. 6G shows image display in the fifth display area, FIG. 6H shows the second touch detection in the first touch detection area R1, FIG. 6I shows image display in the eighth display area, and FIG. 6J shows the second touch detection in the fourth touch detection area R4. By displaying partial images on eight occasions, the entire image of "A" is displayed.

Thus, a unit frame period includes eight display periods and eight touch detection periods. The display period and the touch detection period are alternately arranged. The number of display periods and the number of touch detection periods in a unit frame period are not limited to "eight".

During a display period, the first drive circuit 72 supplies the source signal SS to the multiple source lines and also supplies the gate signal GS to the gate line of the display area in which the image is displayed, and the second drive circuit 74 supplies the reference voltage VCOM to the multiple common electrodes 34. The second drive circuit 74 stops supply of the touch drive signal TX during the display periods.

During each touch detection period, the second drive circuit 74 supplies the touch drive signal TX to the multiple common electrodes 34 in the four touch detection areas. The second drive circuit 74 stops supply of the reference voltage VCOM during the touch detection periods.

During each touch detection period, the touch detection circuit 76 performs detection of a touch by an object to the touch detection area subject to detection, based on the touch detection signals RX received from the multiple common electrodes 34 in the touch detection area subject to detection. The touch detection circuit 76 changes the touch detection area subject to detection in sequence for each touch detection period and detects a touch in a different touch detection area at each touch detection period.

The touch drive signal TX includes a fundamental wave and a harmonic having a frequency different from a designated frequency and does not include a harmonic having the designated frequency. The designated frequency is a frequency for which harmonics should be suppressed and is the frequency of the wireless signal received by the receiver 14. Specifically, the touch drive signal TX does not include harmonics in a predetermined frequency range that includes the designated frequency. The predetermined frequency range is the frequency range of the wireless signal received by the receiver 14.

That "the touch drive signal TX does not include a harmonic having the designated frequency" means that the touch drive signal TX may include a small harmonic component having the designated frequency to a degree that does not affect the reception performance of the receiver 14. The value of the small harmonic component having the designated frequency can be determined by an experiment or the like.

The second drive circuit 74 generates the touch drive signal TX by superimposing the fundamental wave and one or more odd-order harmonics having frequencies lower than the predetermined frequency range on one another.

The order of the harmonic that can be superimposed is denoted by (2n−1), where n denotes an integer equal to or greater than 2. Denoting the fundamental frequency of the fundamental wave by Ft [kHz] and the lowest frequency in the predetermined frequency range by Fr [kHz], Ft(2n−1) <Fr. Therefore, 2n−1<Fr/Ft.

Hereinafter, it is assumed that the predetermined frequency range is the reception frequency range of AM radio and is 500 k-1700 kHz. In other words, Fr is 500 kHz. It is further assumed that Ft is 50 kHz by way of one example. In this example, the maximum (2n−1) that satisfies the above expression is 9.

Figure 7A:
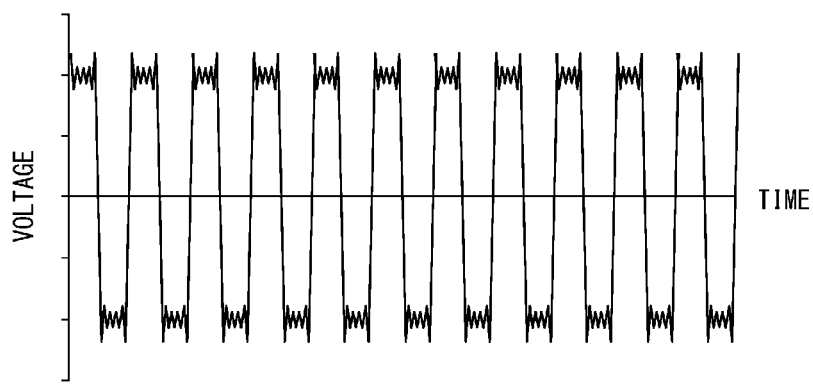
FIG. 7A shows the waveform of the touch drive signal of the display system of FIG. 1.
Figure 7B:
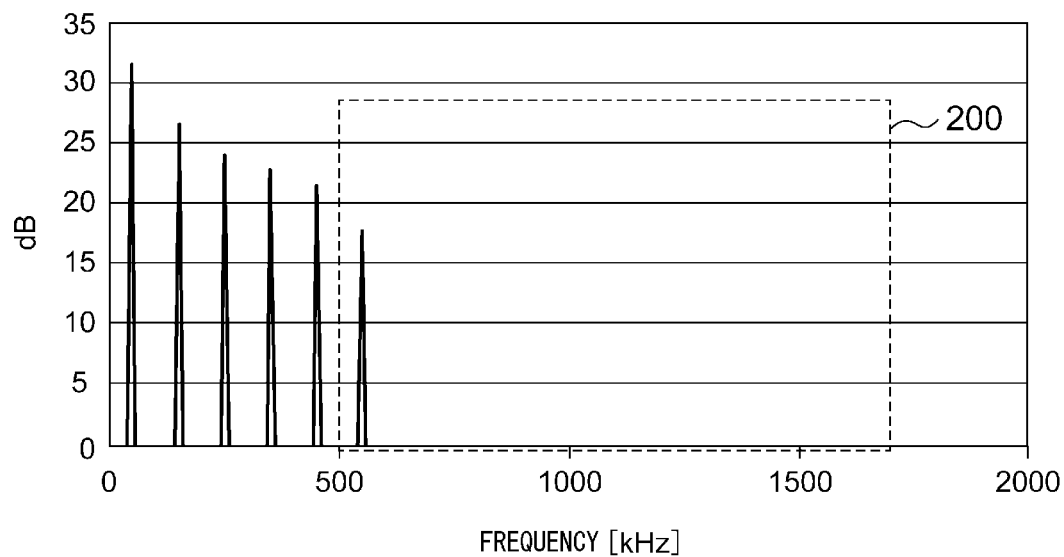
FIG. 7B shows frequency components of the touch drive signal of FIG. 7A.

FIG. 7A shows the waveform of the touch drive signal TX of the display system of FIG. 1, and FIG. 7B shows frequency components of the touch drive signal TX of FIG. 7A. The touch drive signal TX as illustrated is a signal in which the fundamental wave, the third-order harmonic, the fifth-order harmonic, the seventh-order harmonic, and the ninth-order harmonic are superimposed on one another. In other words, the touch drive signal TX includes odd-order harmonics as high as the ninth-order harmonic and does not include harmonics having frequencies higher than that of the ninth-order harmonic. Accordingly, radiation of electromagnetic waves in a reception frequency range 200 can be suppressed. The touch drive signal TX can be said to be a non-sinusoidal wave that includes one or more odd-order harmonics and having particular harmonics removed therefrom.

The embodiment is non-limiting as to the specific superimposition method. For example, the second drive circuit 74 generates a sinusoidal analog signal having the fundamental frequency and sinusoidal analog signals having frequencies three times, five times, seven times, and nine times the fundamental frequency, adds these analog signals in an adder circuit (not shown), and defines the analog signal from the addition as the touch drive signal TX.

Alternatively, the second drive circuit 74 may generate, through digital signal processing, digital numerical data representing a composite waveform based on the numerical data for the multiple sinusoidal waves above, subject the generated data to digital/analog (D/A) conversion, and define the analog signal from the conversion as the touch drive signal TX.

Figure 8:
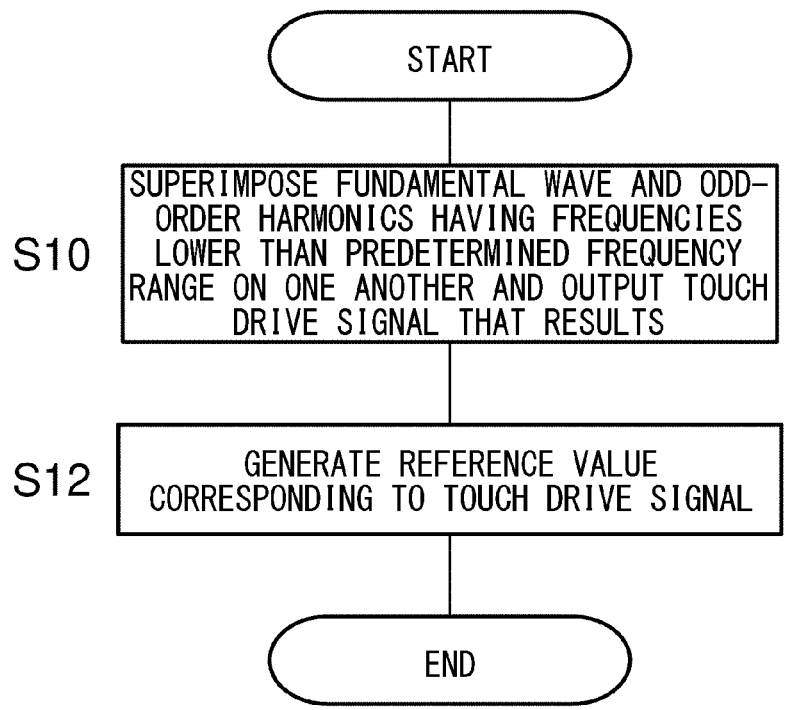
FIG. 8 is a flowchart showing the process performed by the display system of FIG. 1 to generate the touch drive signal.

A description will now be given of the overall operation of the display system 1 having the above configuration. FIG. 8 is a flowchart showing the process performed by the display system 1 of FIG. 1 to generate the touch drive signal TX. The second drive circuit 74 generates the touch drive signal TX by superimposing the fundamental wave and the odd-order harmonics having frequencies lower than the predetermined frequency range on one another (S10). The control circuit 70 generates the reference value corresponding to the touch drive signal TX generated (S12).

A description will now be given of an in-cell touch display according to a comparative example. In the comparative example, the touch drive signal is a rectangular wave or a sinusoidal wave. The frequency of the touch drive signal is 50 kHz.

Figure 9A:
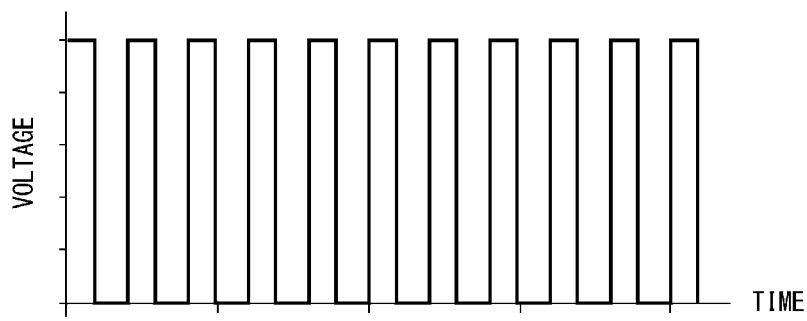
FIG. 9A shows a waveform of the rectangular touch drive signal according to the comparative example.
Figure 9B:
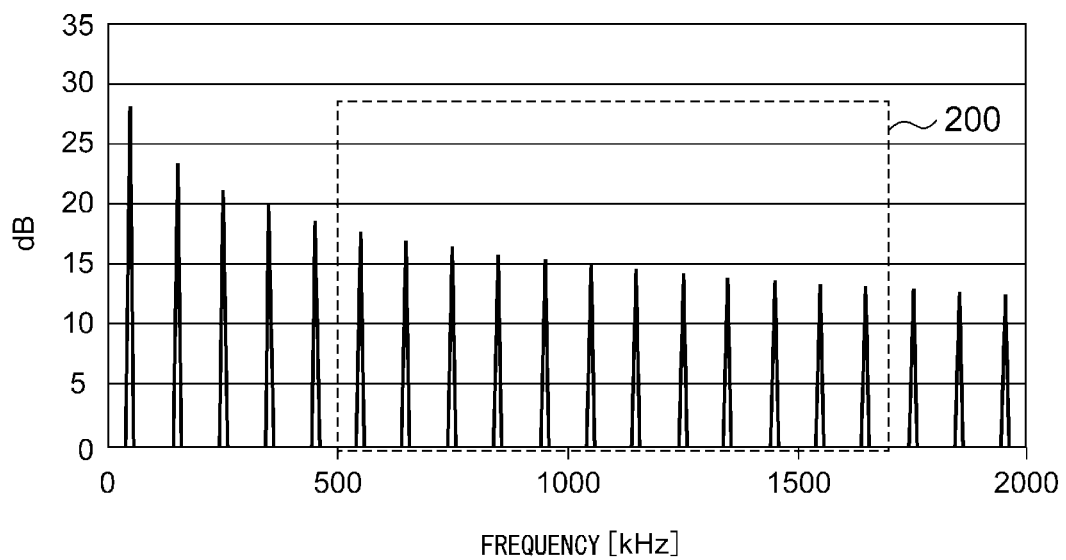
FIG. 9B shows frequency components of the touch drive signal of FIG. 9A.

FIG. 9A shows a waveform of the rectangular touch drive signal according to the comparative example, and FIG. 9B shows frequency components of the touch drive signal of FIG. 9A. The rectangular touch drive signal includes a fundamental wave and multiple odd-order harmonics. The components of the 11th-order through the 33rd-order harmonics are included in the reception frequency range 200 of 500 kHz-1700 kHz. Therefore, radiation of noise including these harmonic components may affect radio reception.

In this embodiment, on the other hand, the touch drive signal TX does not include harmonics in the reception frequency range 200 so that radiation of electromagnetic waves in the reception frequency range 200 can be suppressed.

Figure 10A:
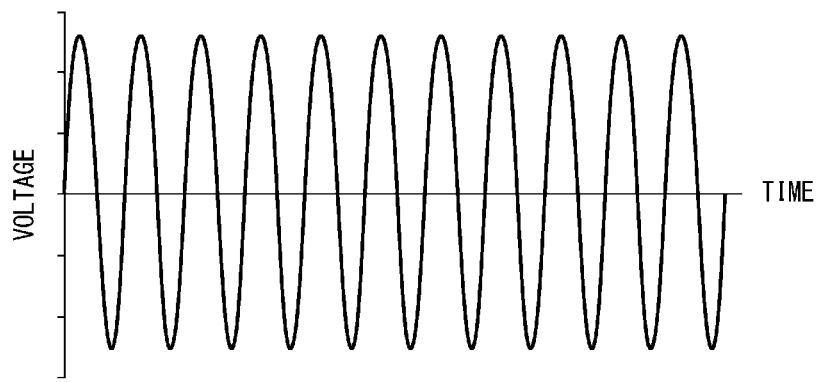
FIG. 10A shows a waveform of the sinusoidal touch drive signal according to the comparative example.
Figure 10B:
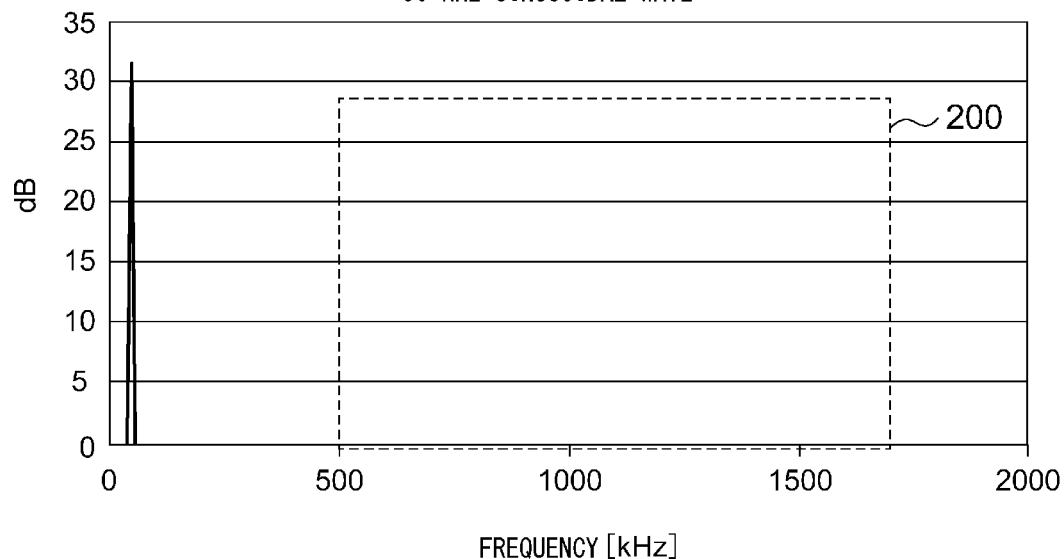
FIG. 10B shows frequency components of the touch drive signal of FIG. 10A.

FIG. 10A shows a waveform of the sinusoidal touch drive signal according to the comparative example, and FIG. 10B shows frequency components of the touch drive signal of FIG. 10A. The sinusoidal touch drive signal is comprised of a fundamental wave and does not include harmonics. Therefore, radiation of electromagnetic waves in the reception frequency range 200 caused by the touch drive signal TX can be suppressed.

In comparison with the rectangular wave of FIG. 9A, on the other hand, the sinusoidal wave rises slowly so that the quantity of electric charge that can be stored in the parasitic capacitance of the common electrode 34 in a predetermined period of time when the sinusoidal wave rises is smaller. This results in a smaller integrated value of the touch detection signal RX, a smaller difference between the integrated value in the presence of a touch and the integrated value in the absence of a touch, and a lower touch detection sensitivity.

Figures 11, 12:
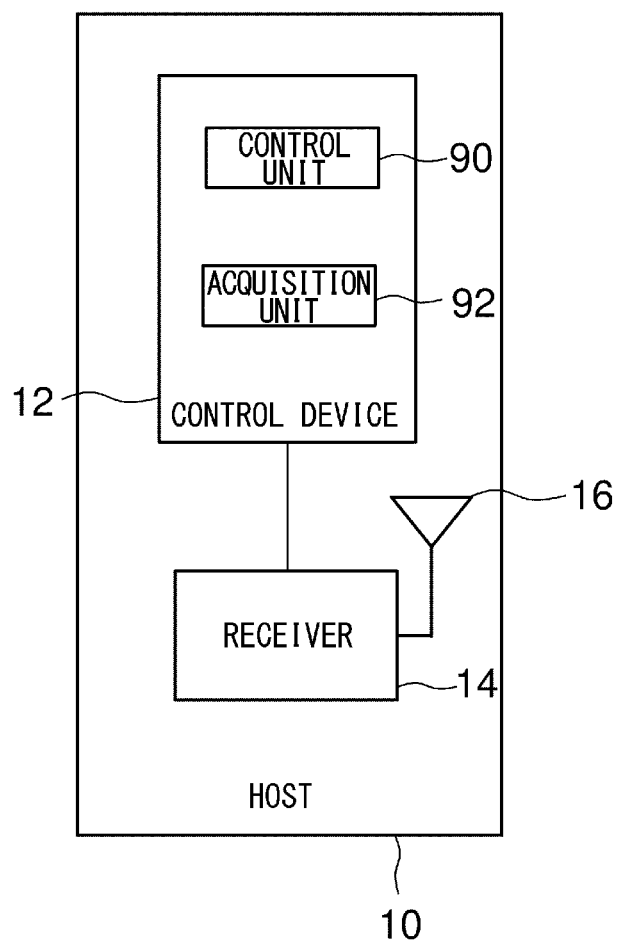
FIG. 11 shows the quantity of electric charge that can be stored in the parasitic capacitance of the common electrode by the touch drive signal according to the first embodiment and the comparative example.
FIG. 12 is a block diagram of the host according to a second embodiment.

FIG. 11 shows the quantity of electric charge that can be stored in the parasitic capacitance of the common electrode 34 by the touch drive signal TX according to the first embodiment and the comparative example. FIG. 11 shows the percentage of the quantity of electric charge stored by the sinusoidal wave and various composite waves with respect to the quantity of electric charge stored by the rectangular wave, which is defined as 100%. The composite waves include a composite wave of the fundamental wave and the third-order harmonic, a composite wave of the fundamental wave and the third- and fifth-order harmonics, a composite wave of the fundamental wave and the third-, fifth-, and seventh-order harmonics, and a composite wave of the fundamental wave and the third-, fifth-, seventh-, and ninth-order harmonics.

When the frequency of the touch drive signal TX is 50 kHz, for example, the quantity of electric charge stored by the sinusoidal wave is decreased to 57.2% with respect to the quantity of electric charge stored by the rectangular wave, but the percentage is improved to 82.6% in the composite wave of the fundamental wave and the third-order harmonic. The percentage is increased to 89.8% when harmonics as high as the ninth-order harmonic are superimposed.

In other words, the touch drive signal TX of this embodiment includes odd-order harmonics having frequencies different from the designated frequency and so rises more sharply than the sinusoidal touch drive signal. As a result, the quantity of electric charge to charge the parasitic capacitance of the common electrode 34 in a predetermined period of time can be increased.

Superimposition of one or more odd-order harmonics as high as the ninth-order on the fundamental wave provides an advantage of improving the quantity of electric charge stored. The larger the number of odd-order harmonics superimposed, the large the quantity of electric charge stored and the higher the touch detection sensitivity.

According to this embodiment, it is possible to maintain radiation of electromagnetic waves having the designated frequency at a level equivalent to that of the sinusoidal wave and, at the same time, to increase the touch detection sensitivity as compared with the case of sinusoidal wave. In other words, the embodiment meets the goals of reducing radiation noise and improving touch detection sensitivity at the same time.

Second Embodiment

The second embodiment differs from the first embodiment in that the designated frequency is acquired, and odd-order harmonics having frequencies lower than the designated frequency thus acquired are superimposed. In the following, description will be given mainly for the differences from the first embodiment.

FIG. 12 is a block diagram of the host 10 according to a second embodiment. The control device 12 of the host 10 includes a control unit 90 and an acquisition unit 92. The control unit 90 controls the receiver 14 and outputs the frequency of the wireless signal received by the receiver 14 to the acquisition unit 92. For example, the control unit 90 starts the radio reception function of the receiver 14 in response to a user operation, controls the reception frequency of the receiver 14 at the frequency selected by the user, and outputs the reception frequency. When the receiver 14 is not in operation, the control unit 90 does not output the reception frequency to the acquisition unit 92. The acquisition unit 92 acquires the reception frequency output from the control unit 90 as the designated frequency and supplies the designated frequency thus acquired to the control circuit 70.

The control circuit 70 acquires the designated frequency supplied from the acquisition unit 92, calculates the maximum order $(2n-1)$ of the odd-order harmonic superimposed, based on the designated frequency and the frequency of the touch drive signal TX, and supplies the maximum order thus calculated to the second drive circuit 74. When the acquisition unit 92 acquires the designated frequency, the second drive circuit 74 generates the touch drive signal TX by superimposing the fundamental wave and one or more odd-order harmonics having frequencies lower than the designated frequency in accordance with the maximum order supplied. This can suppress radiation having the designated frequency.

The higher the designated frequency, the larger the number of odd-order harmonics superimposed by the second drive circuit 74. When the designated frequency is 500 kHz, for example, the second drive circuit 74 superimposes the fundamental wave and four odd-order harmonics as high as the ninth-order on one another. When the designated frequency is 1700 kHz, the second drive circuit 74 superimposes the fundamental wave and 16 odd-order harmonics as high as the 33rd-order. This ensures that the higher the designated frequency, the larger the quantity of electric charge to charge the parasitic capacitance of the common electrode 34 and the higher the touch detection sensitivity in comparison with the first embodiment.

When the acquisition unit 92 does not acquire the designated frequency, the second drive circuit 74 generates the touch drive signal TX by superimposing the fundamental wave and a predetermined number of odd-order harmonics. The predetermined number is defined in accordance with the capability of the second drive circuit 74 to generate the signal. Since it is not necessary to calculate the maximum order of the odd-order harmonic superimposed, the process performed when the designated frequency is not acquired can be simplified. When the designated frequency is not acquired, the receiver 14 is not in operation so that the touch drive signal TX may include a larger number of harmonics than during the operation of the receiver 14.

The predetermined number may be larger than the maximum number of odd-order harmonics superimposed when the designated frequency is acquired by the acquisition unit 92. This can increase the quantity of electric charge to charge the parasitic capacitance of the common electrode 34 and improve the touch detection sensitivity than in the case the designated frequency is acquired.

When the second drive circuit 74 changes the touch drive signal TX, the control circuit 70 derives the reference value used in a determination to find whether or not there has been a touch. This makes it possible to obtain the reference value determined by the quantity of electric charge to charge the parasitic capacitance of the common electrode 34 based on the touch drive signal TX changed and to suppress incorrect touch detection due to the change in the touch drive signal TX.

Figure 13:
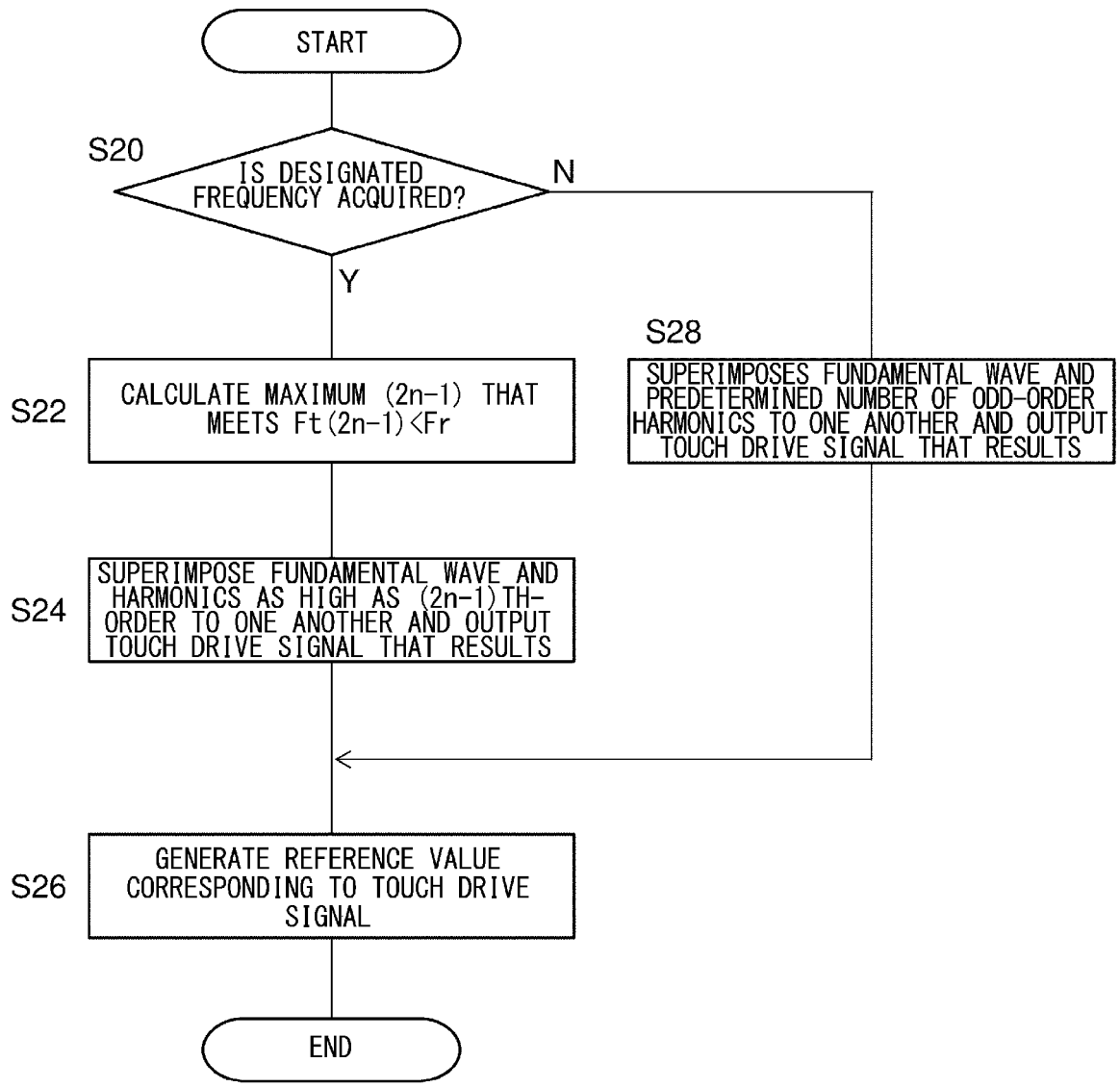
FIG. 13 is a flowchart showing the process performed by the display system according to the second embodiment to generate the touch drive signal.

FIG. 13 is a flowchart showing the process performed by the display system 1 according to the second embodiment to generate the touch drive signal TX. When the designated frequency is acquired (Y in S20), the control circuit 70 calculates the maximum $(2n-1)$ that meets $Ft(2n-1)<Fr$ (S22), and the second drive circuit 74 superimposes the fundamental wave and the harmonics as high as the $(2n-1)$th-order to one another and outputs the touch drive signal TX that results (S24). The control circuit 70 generates the reference value corresponding to the touch drive signal TX thus generated (S26). When the designated frequency is not acquired in S20 (N in S20), the second drive circuit 74 superimposes the fundamental wave and a predetermined number of odd-order harmonics to one another and outputs the touch drive signal TX that results (S28). Controls is shifted to S26.

According to this embodiment, radiation at the designated frequency can be suppressed when the designated frequency is acquired, and the process performed when the designated frequency is not acquired can be simplified.

Third Embodiment

The third embodiment differs from the second embodiment in that a frequency component having the designated frequency in a predetermined rectangular wave is attenuated to generate the touch drive signal TX. In the following, description will be given mainly for the differences from the second embodiment.

When the acquisition unit 92 acquires the designated frequency, the second drive circuit 74 generates the touch drive signal TX by attenuating a frequency component having the designated frequency in a rectangular wave having a fundamental frequency. Therefore, the touch drive signal TX does not include a harmonic having the designated frequency.

The embodiment is non-limiting as to the method of attenuating the frequency component having the designated frequency. For example, the second drive circuit 74 may generate the touch drive signal TX by synthesizing the rectangular wave with a sinusoidal wave, the sinusoidal wave has the designated frequency and has the opposite phase with respect to the waveform of the frequency component having the designated frequency in the rectangular wave. The amplitude of the sinusoidal wave having the designated frequency and having the opposite phase is set to suit the magnitude of the frequency component having the designated frequency in the rectangular wave. When the designated frequency is equal to the frequency of one of odd-order harmonics, the relevant odd-harmonic is canceled. When the designated frequency is not equal to the frequency of any of odd-order harmonics in the rectangular wave, the noise having the designated frequency is canceled.

When the acquisition unit 92 does not acquire the designated frequency, the second drive circuit 74 generates the touch drive signal TX of the rectangular wave. In other words, the rectangular wave is not synthesized with a sinusoidal wave having the opposite phase. This can reduce the power consumption.

Figure 14:
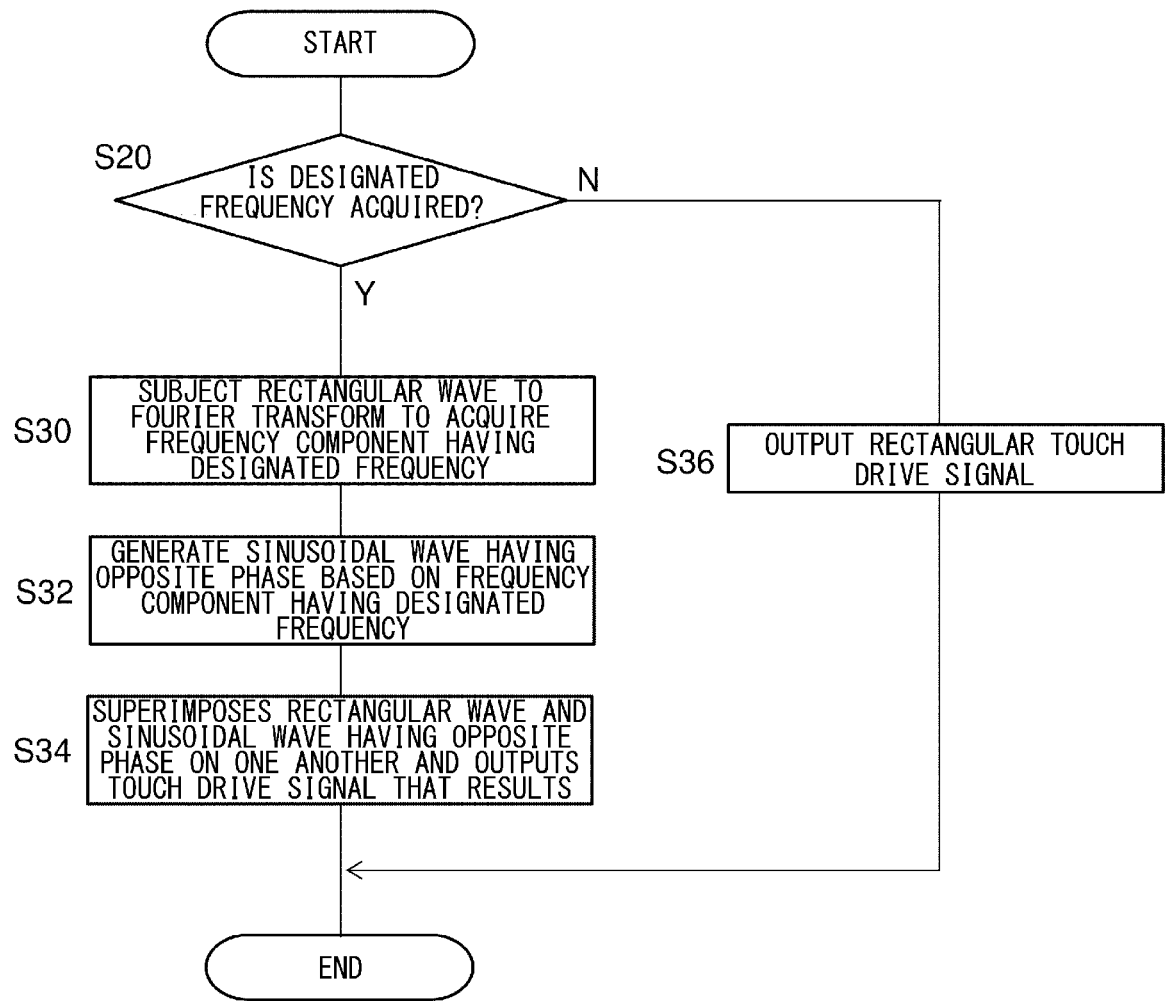
FIG. 14 is a flowchart showing the process performed by the display system according to the third embodiment to generate the touch drive signal.

FIG. 14 is a flowchart showing the process performed by the display system 1 according to the third embodiment to generate the touch drive signal TX. When the designated frequency is acquired (Y in S20), the control circuit 70 subjects a predetermined rectangular wave to Fourier transform to acquire the frequency component having the designated frequency (S30). The second drive circuit 74 generates a sinusoidal wave having the opposite phase based on the frequency component having the designated frequency thus acquired (S32), superimposes the rectangular wave and the sinusoidal wave having the opposite phase on one another, and outputs the touch drive signal TX that results (S34). When the designated frequency is not acquired in S20 (N in S20), the second drive circuit 74 outputs the touch drive signal TX of the rectangular wave (S36).

In an alternative method of attenuating the frequency component having the designated frequency, the second drive circuit 74 may allow the data for a rectangular wave to pass through a band stop filter (not shown) comprised of a digital filter and subject the output data from the filter to D/A conversion to generate the touch drive signal TX. This can improve the flexibility of the configuration of the display system 1. A low pass filter may be used in place of the band stop filter.

Figure 15:
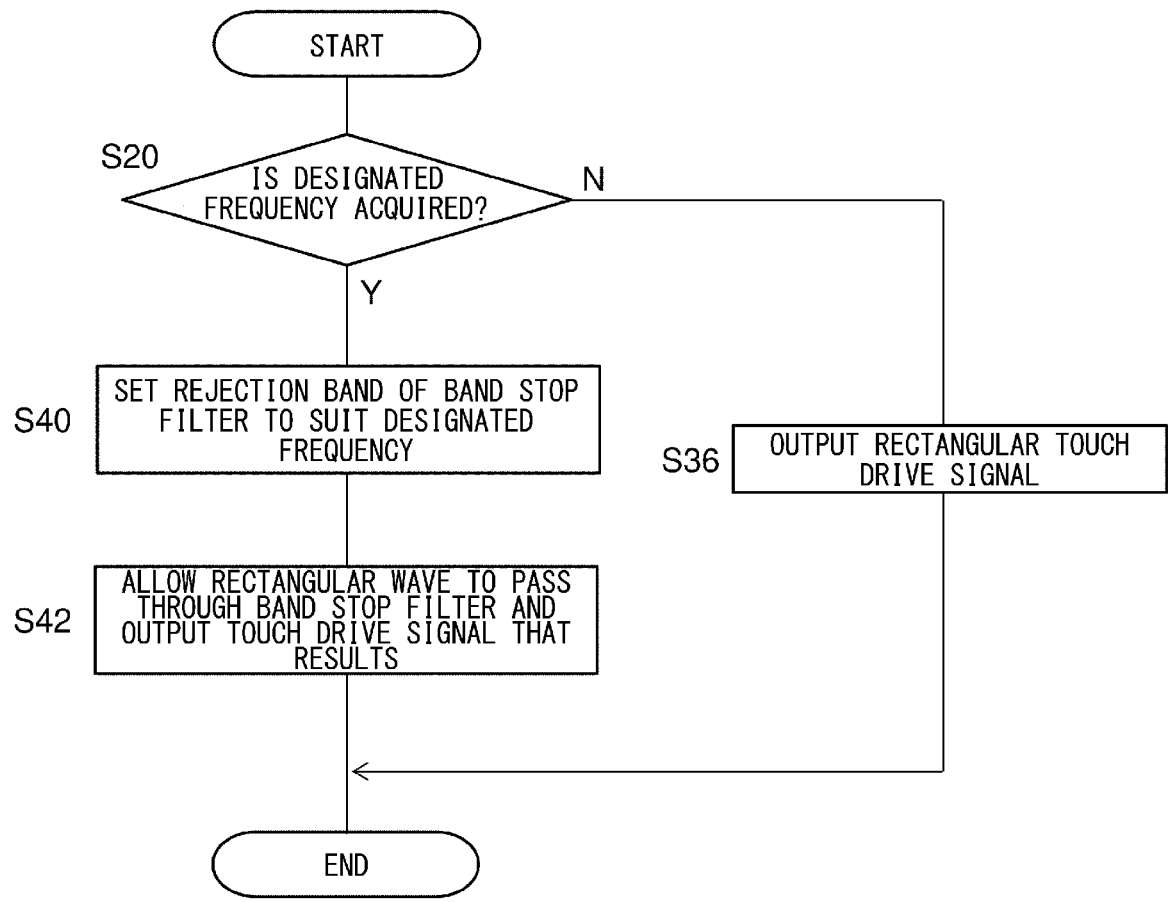
FIG. 15 is a flowchart showing another process performed by the display system according to the third embodiment to generate the touch drive signal.

FIG. 15 is a flowchart showing another process performed by the display system 1 according to the third embodiment to generate the touch drive signal TX. When the designated frequency is acquired (Y in S20), the second drive circuit 74 sets the rejection band of the band stop filter to suit the designated frequency (S40), allows the rectangular wave to pass through the band stop filter, and outputs the touch drive signal TX that results (S42). When the designated frequency is not acquired in S20 (N in S20), the second drive circuit 74 outputs the touch drive signal TX of the rectangular wave (S36).

According to this embodiment, a touch drive signal TX that does not include a harmonic component having a designated frequency can be generated when the designated frequency is acquired. When the designated frequency is not acquired, the power consumption can be reduced.

The present disclosure has been described with reference to embodiments. The embodiments are intended to be illustrative only, and it will be obvious to those skilled in the art that various modifications to a combination of constituting elements or processes in the embodiments could be developed and that such modifications also fall within the scope of the present disclosure.

In the third embodiment, for example, the second drive circuit 74 may, as in the first embodiment, generate the touch drive signal TX by attenuating frequency components in a predetermined frequency range that includes the designated frequency. In this case, the second drive circuit 74 generates, for each of multiple odd-order harmonics in the predetermined frequency range in the rectangular wave, a sinusoidal wave having the opposite phase with respect to the odd-order harmonic and synthesizes multiple opposite-phase sinusoidal waves thus generated and the rectangular wave on one another to cancel the multiple odd-order harmonics in the predetermined frequency range. When a band stop filter is used, the second drive circuit 74 sets the rejection band of the filter to be in the predetermined frequency range. In this variation, the process to acquire the designated frequency is not necessary.

Further, the control device 24 is included in the touch display 20 in the embodiments, but the control device 24 may be included in the host 10. In the embodiments, the first drive circuit 72 generates the reference clock signal, but the second drive circuit 74 may generate the reference clock signal. The number of touch detection periods included in the unit frame period may be the same as the number of touch detection areas on the display device 22, or may be more than three times the number of touch detection areas on the display device 22. These variations allow greater flexibility in the configuration of the display system 1.

A display system according to an embodiment of the present disclosure includes:
a display device including a plurality of common electrodes commonly used for image display and touch detection;
a drive circuit that supplies a touch drive signal to each of the plurality of common electrodes; and
a touch detection circuit that detects a touch by an object on the display device based on a detection signal received from each of the plurality of common electrodes, wherein
the touch drive signal includes a harmonic having a frequency different from a designated frequency and does not include a harmonic having the designated frequency.

According to this embodiment, the goals of reducing radiation noise and improving touch detection sensitivity at the same time can both be met.

In the display system according to an embodiment of the present disclosure, the drive circuit may, for example, generate the touch drive signal by superimposing a fundamental wave and one or more odd-order harmonics having frequencies lower than a predetermined frequency range that includes the designated frequency.

In this case, radiation in a predetermined frequency range can be suppressed.

The display system according to an embodiment of the present disclosure may, for example, further include: an acquisition unit that acquires the designated frequency, wherein
when the acquisition unit acquires the designated frequency, the drive circuit may generate the touch drive signal by superimposing a fundamental wave and one or more odd-order harmonics having frequencies lower than the designated frequency on one another.

In this case, radiation having a designated frequency can be suppressed.

In the display system according to an embodiment of the present disclosure, for example,
when the acquisition unit does not acquire the designated frequency, the drive circuit may generate the touch drive signal by superimposing the fundamental wave and a predetermined number of odd-order harmonics on one another.

In this case, the process performed when the designated frequency is not acquired can be simplified.

The display system according to an embodiment of the present disclosure may, for example, further include:
an acquisition unit that acquires the designated frequency, wherein
when the acquisition unit acquires the designated frequency, the drive circuit may generate the touch drive signal by attenuating a frequency component having the designated frequency in a rectangular wave having a fundamental frequency.

In this case, the touch drive signal that does not include the harmonic having the designated frequency can be generated.

In the display system according to an embodiment of the present disclosure, for example, when the acquisition unit does not acquire the designated frequency, the drive circuit may generate the touch drive signal of the rectangular wave.

In this case, the power consumption can be reduced.

In the display system according to an embodiment of the present disclosure, for example, when the acquisition unit acquires the designated frequency, the drive circuit may generate the touch drive signal by synthesizing the rectangular wave with a sinusoidal wave, the sinusoidal wave has the designated frequency, and the sinusoidal wave has the opposite phase with respect to a waveform of the frequency component having the designated frequency in the rectangular wave.

In this case, the harmonic having the designated frequency can be attenuated.

The display system according to an embodiment of the present disclosure may, for example, further include a control circuit that derives a reference value related to a reference capacitance of each common electrode based on the detection signal received from each of the plurality of common electrodes, wherein the touch detection circuit may detect a touch based on the detection signal and the reference value.

In this case, the reference value based on the touch drive signal can be obtained so that incorrect touch detection can be suppressed.

The control device according to an embodiment of the present disclosure is a control device adapted to control a display device including a plurality of common electrodes commonly used for image display and touch detection, the control device including:

a drive circuit that supplies a touch drive signal to each of the plurality of common electrodes; and a touch detection circuit that detects a touch by an object on the display device based on a detection signal received from each of the plurality of common electrodes, wherein the touch drive signal includes a harmonic having a frequency different from a designated frequency and does not include a harmonic having the designated frequency.

According to this embodiment, the goals of reducing radiation noise and improving touch detection sensitivity at the same time can both be met.

The control method according to an embodiment of the present disclosure is a control method adapted to control a display device including a plurality of common electrodes commonly used for image display and touch detection, the control method including:

supplying a touch drive signal to each of the plurality of common electrodes; and detecting a touch by an object on the display device based on a detection signal received from each of the plurality of common electrodes, wherein the touch drive signal includes a harmonic having a frequency different from a designated frequency and does not include a harmonic having the designated frequency.

According to this embodiment, the goals of reducing radiation noise and improving touch detection sensitivity at the same time can both be met.

While various embodiments have been described herein above, it is to be appreciated that various changes in form and detail may be made without departing from the spirit and scope of the invention(s) presently or hereafter claimed.

The invention claimed is:

1. A control method adapted to control a display device, the display device comprising a plurality of common electrodes, the plurality of common electrodes being commonly used for image display and touch detection, the control method comprising:

generating a touch drive signal by superimposing a fundamental wave and one or more odd-order harmonics having frequencies lower than a predetermined frequency range that includes a designated frequency on one another;

supplying the touch drive signal to each of the plurality of common electrodes; and detecting a touch by an object on the display device based on a detection signal received from each of the plurality of common electrodes, wherein the touch drive signal includes a harmonic having a frequency different from the designated frequency and does not include a harmonic having the designated frequency.

2. The control method according to claim 1, further comprising:

acquiring the designated frequency, wherein the touch drive signal is generated by superimposing the fundamental wave and the one or more odd-order harmonics having frequencies lower than the designated frequency on one another when the designated frequency is acquired.

3. The control method according to claim 2, wherein the touch drive signal is generated by superimposing the fundamental wave and a predetermined number of odd-order harmonics on one another when the designated frequency is not acquired.

4. The display-system control method according to claim 1, further comprising:

deriving a reference value related to a reference capacitance of each common electrode based on the detection signal received from each of the plurality of common electrodes; and detecting a touch based on the detection signal and the reference value.

5. A control method adapted to control a display device, the display device comprising a plurality of common electrodes, the plurality of common electrodes being commonly used for image display and touch detection, the control method comprising:

acquiring a designated frequency;

generating a touch drive signal by superimposing a fundamental wave and one or more odd-order harmonics having frequencies lower than the designated frequency on one another when the designated frequency is acquired;

supplying the touch drive signal to each of the plurality of common electrodes; and detecting a touch by an object on the display device based on a detection signal received from each of the plurality of common electrodes, wherein the touch drive signal includes a harmonic having a frequency different from the designated frequency and does not include a harmonic having the designated frequency.

6. A control method adapted to control a display device, the display device comprising a plurality of common electrodes, the plurality of common electrodes being commonly used for image display and touch detection, the control method comprising:

acquiring a designated frequency;

generating a touch drive signal by synthesizing a rectangular wave with a sinusoidal wave, the sinusoidal wave having the designated frequency, and the sinusoidal wave having an opposite phase with respect to a waveform of a frequency component having the designated frequency in the rectangular wave when the designated frequency is acquired;

supplying the touch drive signal to each of the plurality of common electrodes; and detecting a touch by an object on the display device based on a detection signal received from each of the plurality of common electrodes, wherein the touch drive signal includes a harmonic having a frequency different from the designated frequency and does not include a harmonic having the designated frequency.

* * * * *